Feb. 20, 1951         H. FRIEDMAN         2,542,022
X-RAY METHOD AND APPARATUS
Filed July 19, 1946                 2 Sheets-Sheet 1

INVENTOR.
HERBERT FRIEDMAN
BY  M. O. Hayes
ATTORNEY

Feb. 20, 1951  H. FRIEDMAN  2,542,022
X-RAY METHOD AND APPARATUS
Filed July 19, 1946  2 Sheets-Sheet 2
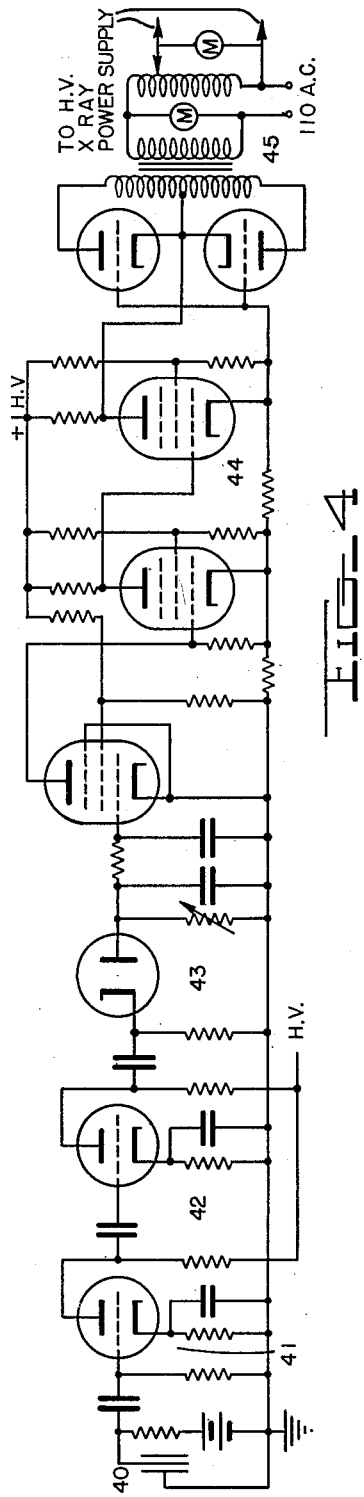
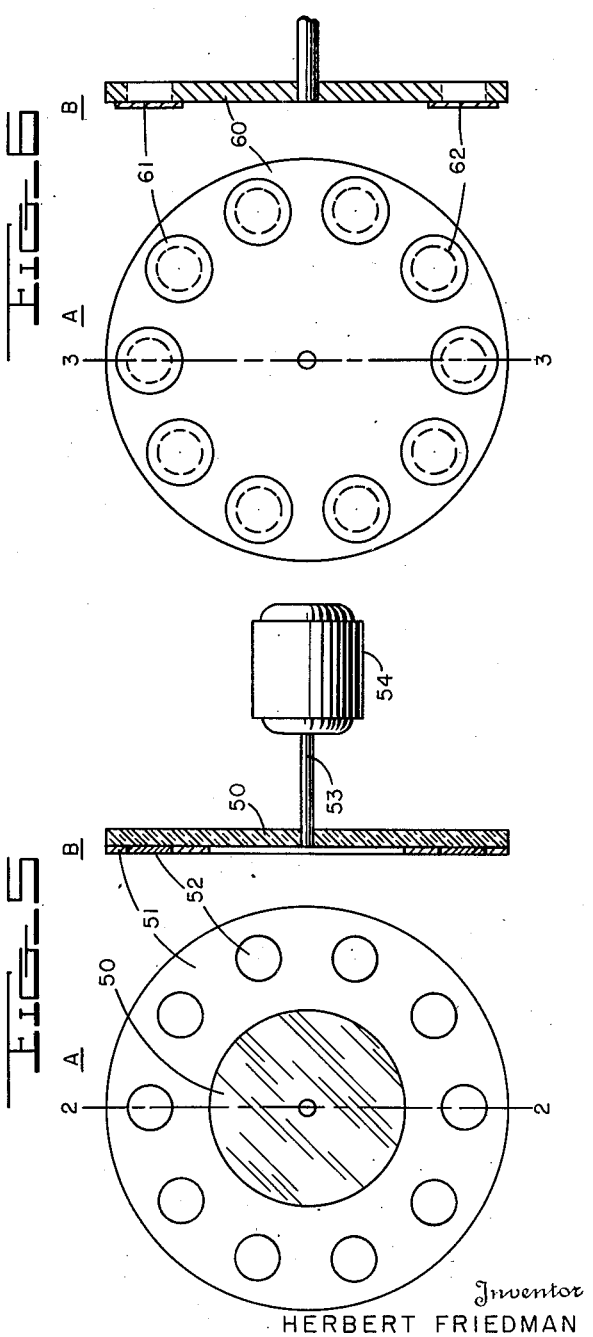
Inventor
HERBERT FRIEDMAN
By M. O. Hayes
Attorney Patented Feb. 20, 1951

2,542,022

UNITED STATES PATENT OFFICE 2,542,022

X-RAY METHOD AND APPARATUS

Herbert Friedman, Arlington, Va.

Application July 19, 1946, Serial No. 684,909

5 Claims. (Cl. 250—83.6)

(Granted under the act of March 3, 1883, as amended April 30, 1928; 370 O. G. 757)

My invention relates to methods for measuring and controlling X-ray intensity, and more particularly to a method and apparatus for the measurement and control of X-ray intensity at a preselected frequency.

An object of my invention is to provide a method for the measurement of X-ray intensity at a particular frequency.

Another object of my invention is to provide a method and apparatus for operating an X-ray source with the radiation intensity at a particular frequency regulated irrespective of other frequencies in the X-ray spectrum.

Still another object of my invention is to provide a method and apparatus for rapidly and automatically stabilizing the intensity of X-rays at a particular location, irrespective of fluctuation in the X-ray power supply voltage or permeability of the transmitting medium.

Other and further objects and features of my invention will be apparent from the following specification and drawings.

The effective use of X-rays in scientific research, medicine, and for industrial applications depends, to a large degree, upon accurate control of the hardness and intensity of the X-rays emitted by the radiation source. X-rays possess an energy content which is related to their frequency as well as to their intensity; this X-ray energy provides the means for a large field of study of the composition and structure of materials.

By irradiation of a crystalline structure, a diffraction pattern may be obtained from which the crystal structure itself may be determined. Non-crystalline and powdered substances or liquids provide a diffraction pattern of varying intensities of X-rays at particular angles of diffraction, and a study of these so-called diffraction lines provides the basis for analytical means having great sensitivity and a wide range of application.

In analytical use, and a considerable number of other uses, it is essential that the intensity of radiation emitted at particular frequencies from an X-ray source be measurable, and that such radiation be controllable. X-rays will cause secondary radiation to be emitted by an element, particularly strongly by metals, wherein this effect is caused most efficiently by a specific frequency of radiation for each metal. The most important of these causal radiations is the $K_a$ component of the radiation spectrum, and it is this component of the output spectrum of an X-ray source which it is particularly desirable to stabilize.

It is well known to the art that a particular X-ray tube gives an output spectrum which is determined to a large extent by the voltage applied across the tube. Thus, a particular tube may be made to produce "harder" X-rays, or radiations of shorter wavelength, by increasing the potential between the anode and cathode.

Heretofore, X-ray tubes have been controlled with regard to their intensity and frequency of radiation by means of devices in the power supply circuit which maintain a constant voltage across the tube. Such methods, however, while controlling the approximate output intensity of all radiations, were not sufficiently effective in controlling the intensity of any narrow band of radiations so that maximum satisfaction was obtained in work requiring a high stability of X-ray intensity at a particular frequency.

My invention utilizes a novel principle whereby the radiation of a selected frequency from an X-ray source at a particular location is detected and measured. The indication thus obtained may be used to control the input voltage to the X-ray source in such a manner that radiations of a particular frequency may be continuously stabilized at a desired intensity.

Briefly, the apparatus of my invention includes a detecting device, preferably a Geiger-Mueller counter, placed at the location at which the particular radiation is to be measured. Interposed between radiation source and detector is a filter device having portions of a permeability to the radiation concerned differing from the permeability of other portions of the device. The device is caused to interrupt the beam of radiations impinging upon the detector tube in such a way that differing portions are alternately presented to the beam at a fixed frequency, preferably an audio frequency, thereby producing a series of pulses in the Geiger-Mueller counter which fluctuate in like manner. This alternating current voltage is amplified and detected, providing a voltage output which varies in magnitude in a manner dependent upon the intensity of the radiation frequency band concerned. This voltage may be used as an indication of radiation intensity at this frequency, or it may also be utilized to control the supply voltage to the X-ray tube, thus continuously stabilizing X-ray intensity at the frequency concerned.

For a better understanding of my invention, reference may be had to the accompanying drawings wherein:

Figure 4 is a schematic diagram of the control circuit showing how the Geiger-Mueller counter output can be used as a means for controlling the high voltage applied to the X-ray tube;

Figure 1:
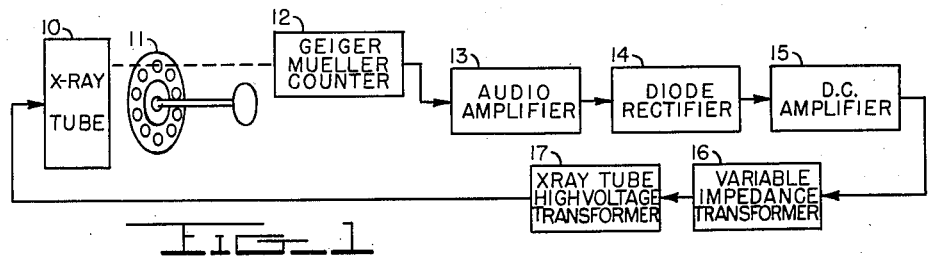
Figure 1 is a block diagram of the invention when used as a control device for stabilizing X-ray intensity at a particular range of radiation frequencies.

Figure 5, parts A and B, shows a filter device comprising a rotating filter of alternately varying permeabilities to the radiation concerned, its driving motor, and shaft;

Figure 6, parts A and B, shows a modification of the filter disk shown in Figure 5.

Referring to the accompanying drawings, like reference characters refer to like parts.

In Figure 1, a conventional X-ray source 10 provides a beam of radiation which strikes filter disk 11, and passes through to Geiger-Mueller counter tube 12. One material of which intermediate parts of the filter disk are constructed will pass the frequency of radiation whose intensity it is desired to control, while the remaining parts will not pass this frequency. Because of the rotation of the filter disk, and because of its construction of alternate sections of two such materials, the beam of radiation passing through it is chopped into components alternately containing and not containing the frequency of radiation whose intensity is to be controlled.

The theory and construction of such filters is described by P. A. Ross in the Physical Review, vol. 28, p. 425 (1926), and in the Journal of the Optical Society, vol. 16, p. 433 (1928).

The chopping frequency is an audio frequency, and the filtered beam of radiation thus causes successive ionizations of the Geiger-Mueller counter at the same audio frequency. The beam is so aligned that it can reach the Geiger-Mueller counter tube only by passing through the filter device.

From the counter, the audio signal passes through amplifier 13, rectifier 14, amplifier 15, and thence to variable impedance transformer 16. This transformer 16 controls the high voltage transformer rectifier unit supplying the X-ray tube. Any change in the intensity of the particular frequency of radiation to be controlled will thus make itself evident as a variation in the impedance of transformer 16 and resultant variation in the intensity of the X-ray beam.

Figure 2:
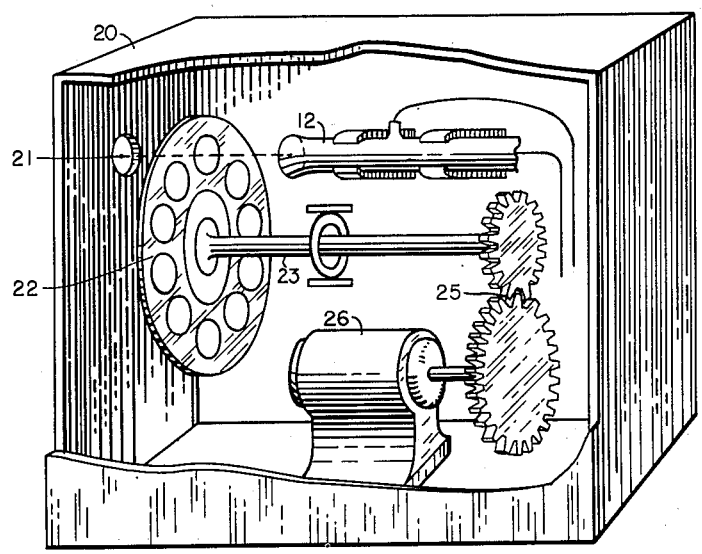
Figure 2 is a cutaway drawing showing an embodiment of the detector and filter device unit.

In Figure 2, a specific embodiment of the filter device and the detector is shown enclosed in housing 20. Through window 21 the beam of radiation impinges on filter disk 22 comprising alternate areas of two different metal foils. The disk revolves on shaft 23, which in turn is actuated by gear train 25 driven by motor 26. Rotation of the disk is at such a speed that the beam will be interrupted at an audio frequency. After passing through the filter disk, the beam strikes the window of Geiger-Mueller counter tube 12 to cause ionization and induce discharge within.

A preferable type of counter tube is of the bubble-window type, with copper cathode and a gaseous filling. The type of $K_a$ radiation it is desired to absorb will determine the exact nature of the gaseous filling. For $K_a$ radiation from a copper target X-ray tube, argon is suitable, or krypton for that from a molybdenum target tube. Quenching vapor within the tube may be alcohol, petroleum ether or methylene bromide. An external Neher-Harper or Neher-Pickering quenching circuit will also be satisfactory to quench discharges in the counter tube.

Figure 3:
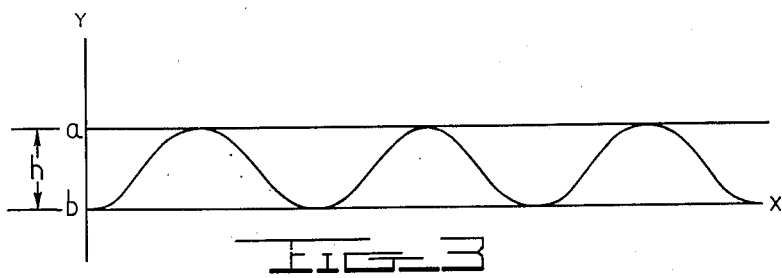
Figure 3 is a graph of the frequency component of the output voltage from the Geiger-Mueller counter tube plotted against time to which the control device is responsive.

The controlling output component from the counter tube is shown graphically in Figure 3, where the Y-axis represents a voltage output, plotted against time. Voltage level at $b$ is proportional to ionization caused by the entire range of frequency of radiation, while that at $a$ is proportional to ionization caused by the entire range of frequency minus the frequency whose intensity is to be stabilized. The amplitude, $a-b$, or $h$, is proportional to the intensity of this particular frequency. The voltage levels of Fig. 3 represent the envelope of the maximum tube potential reached preceding breakdown, and lie within the plateau voltage limits of the tube. The voltage values at $a$ represent low counting rates where the counter anode recovers between pulses to values in the upper plateau region near the power supply potential, while the values at $b$ represent higher counting rates where the tube fires at or soon after recovery to the lower plateau voltage. For most X-ray spectrographic work, it is preferable to use the $K_a$ frequency. By suitable construction of the filter device, the controlling output component of the Geiger-Mueller counter may be obtained essentially as a sine wave. The pulse output components are not shown in Fig. 3, as they are later eliminated by a filter network and do not themselves operate as a control signal.

The schematic diagram of Figure 4 shows the means whereby the audio frequency waveform from the Geiger-Mueller counter 40 is applied to and amplified through two stages 41 and 42 of audio amplification and rectified by rectifier 43 before the detector portion of the circuit is reached. The time constants of the coupling and bypass elements for tubes 40, 41 and 42 are designed for the audio component of Fig. 3, and accordingly the condensers will normally be larger than is usual in counter pulse amplifiers where audio components are not desired or not present. The detector portion 44 gives a D. C. output proportional to the amplitude of the audio waveform. Thereafter, a control voltage generator 45 produces a voltage of the proper magnitude and direction to change the X-ray power supply to regulate the high voltage on the X-ray tube. Thus, the intensity of the frequency to be stabilized is held constant.

The high voltage X-ray power supply comprises a transformer and rectifier circuit. To the primary of the transformer may be supplied the control voltage generated in the latter part of the circuit Figure 4, thus regulating voltage on the X-ray source.

The filter device of Figure 5, parts A and B, comprises a disk 50 of material virtually transparent to X-rays to which is attached a wide band of metal foil 51 permeable to the entire spectrum of radiation concerned, with but slight absorption, having equally spaced openings, which openings are covered with small disks 52 of a metal foil permeable to all frequencies except that one whose intensity is to be stabilized.

For radiation from an X-ray tube with a copper target, a disk such as that of Figure 5 should be constructed with small disks 52 of nickel to filter out $K_a$ radiation and the larger areas 51 of cobalt foil.

In Figure 5B, the disk 50 is shown mounted concentrically on shaft 53 driven by motor 54, which should rotate at a uniform speed which will bring the small disks into the path of the beam of radiation and interrupt it at an audio frequency.

It is necessary to use foil of a metal permeable to the frequency whose intensity is to be controlled because of a slight absorption by all metals of the remainder of the X-ray spectrum. The use of such foil will then balance a like absorption in that which is impermeable to the frequency to be controlled.

Another embodiment of a filter device is shown in Figure 6, parts A and B, wherein a metal disk 60 of brass, steel or other material relatively impervious to X-rays is provided with equally spaced holes covered alternately with metal foils 61 and 62, one of which is permeable and the other non-permeable by the radiation whose intensity is to be controlled. The rotation of this disk through a beam of X-rays will produce a pulsing X-ray beam wherein the frequency to be controlled is periodically filtered out, in the same manner as will the disk of Figure 5. Even though the holes and covering foils in the disk of Figure 6 be touching each other, however, not as pure a sine wave of variation of the X-ray beam will result as does from the use of the disk of Figure 5. Many other embodiments of such filters may be employed, the selection of a particular embodiment being a prerogative of the designer, and the particular embodiments are described for illustrative purposes only.

In the operation of the apparatus described, the detector and filter device unit may be located in any of several positions; at an unused port of a multi-port X-ray tube, in a location where a portion of the X-ray output may be sampled directly, behind an object being subjected to radiation, or in a position to receive the diffracted beam from a crystal or secondary radiation from a sample. The remainder of the units may be located elsewhere, as convenient, or in conjunction with the X-ray power supply. The filter disk itself may be removable and replaceable by another of different materials or of different construction for a change in the frequency of the K radiation to be controlled.

The filter device may be modified to take the form of a reciprocating shutter, or may be embodied in a variety of types of the rotating disk.

The Geiger-Mueller counter tube likewise may be modified in its shape or incidental structure. In Figure 4, the circuit diagram is intended as exemplary and may be deviated from to accomplish the function of a means for controlling X-ray tube voltage.

It can be seen from the foregoing that my invention has refined the technique of X-ray measurements by introducing a method and apparatus for accurately controlling the intensity of radiation at a preselected frequency. Controls heretofore available operated principally by regulating the X-ray tube input voltage independently, whereas the method I propose utilizes the intensity of a portion of the output to control the input, thereby, automatically ensuring complete control of at least that portion. Accuracy of approximately one-tenth of one percent is possible in such regulation.

The high degree of precision and accuracy possible by this means is especially useful in analytical and therapeutic work, freeing the user from uncertainties as to fluctuations in the power supply. Such fluctuations cause changes in X-ray tube voltage which shift the output spectrum and beam intensity.

Since certain changes in carrying out the above method and in the construction set forth, which embody the invention, may be made without departing from its scope, it is intended that all matter contained in the above description or shown in the accompanying drawings shall be interpreted as illustrative and not in a limiting sense.

The invention described herein may be manufactured and used by or for the Government of the United States of America for governmental purposes without the payment of any royalties thereon or therefor.

What is claimed is:

1. A method of stabilizing intensity of X-radiation at its source, comprising intermittently filtering portions of a radiation spectrum from a beam of the radiation, detecting the intermittently varying radiation, converting the detection signal to a voltage proportional to changes in the intermittently varying intensity of said signal, and varying the intensity of the output of an X-ray source according to the voltage output from the detection signal converter.

2. A method of stabilizing intensity of X-radiation at its source, comprising intermittently filtering portions of a radiation spectrum from a beam of the radiation, detecting the intermittently varying radiation with a Geiger-Mueller counter, converting the detection signal from said Geiger-Mueller counter to a voltage proportional to changes in the intermittently varying intensity of said signal, and varying the intensity of the output of an X-ray source according to the voltage output from the detection signal converter.

3. A method of stabilizing intensity of $K\alpha$ X-radiation at its source, comprising intermittently filtering the $K\alpha$ frequency of a radiation spectrum from a beam of X-radiation, detecting the intermittently varying radiation, converting the detection signal to a voltage proportional to changes in the intermittently varying intensity of said signal, said changes being proportional to intensity of $K\alpha$ radiation, and varying the intensity of the output of an X-ray source according to the voltage output from the detection signal converter.

4. Apparatus for controlling X-ray intensity, comprising means for intermittently filtering portions of a radiation spectrum from a beam of the radiation at an audio frequency, said portions being of a frequency of radiation whose intensity is to be controlled, means for detecting the intermittently varying radiation comprising a Geiger-Mueller counter, and means for converting the detection signal from the Geiger-Mueller counter into a voltage proportioned to changes in the intermittently varying intensity of said signal, said detection signal being a pulse of the same audio frequency as that produced by the filtering means, with amplitude proportional to the intensity of the filtered frequency of radiation, and means for varying the intensity of the output of an X-ray source according to the voltage output from the detection signal converter.

5. A stabilized intensity X-ray system including an X-ray tube, variable high voltage supply means connected to the tube, an X-ray detector positioned to receive radiation from the tube, intermittently operative filter means interposed between the tube and detector means to modulate the radiation detected, and control means for the variable voltage supply means operative in dependency on the modulation amplitude output of the detector means.

HERBERT FRIEDMAN.

REFERENCES CITED

The following references are of record in the file of this patent:

UNITED STATES PATENTS

| Number | Name | Date |
|---|---|---|
| 2,222,451 | Trost | Nov. 19, 1940 |
| 2,240,478 | Bischoff et al. | May 6, 1941 |
| 2,275,748 | Fearon | Mar. 10, 1942 |
| 2,451,572 | Moore | Oct. 19, 1948 |

OTHER REFERENCES

Locher et al., Radiology, vol. 27, 1936, pp. 149, 154 and 156.